(12) United States Patent
Zadik et al.

(10) Patent No.: US 12,541,360 B1
(45) Date of Patent: Feb. 3, 2026

(54) SYSTEM AND METHOD FOR DETECTING SOFTWARE LIFECYCLE VULNERABILITIES

(71) Applicant: Wiz, Inc., New York, NY (US)

(72) Inventors: Shay Zadik, Tel Aviv (IL); Mattan Shalev, Tel Aviv (IL); Gal Kozoshnik, Petah Tikva (IL); Omri Kornblau, Tel Aviv (IL); Yaniv Shaked, Tel Aviv (IL); Alon Weiss, Tel Aviv (IL); Addi Grinboum, Ramat Sharon (IL); Idan Shoval, Rishon Lezion (IL); Mika Maymon, Tel Aviv (IL); Maayan Laav, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/977,312

(22) Filed: Dec. 11, 2024

(51) Int. Cl.
| | |
|---|---|
| *G06F 9/44* | (2018.01) |
| *G06F 8/65* | (2018.01) |
| *G06F 9/455* | (2018.01) |
| *G06F 11/07* | (2006.01) |
| *G06F 15/16* | (2006.01) |

(52) U.S. Cl.
CPC ...................................... *G06F 8/65* (2013.01)

(58) Field of Classification Search
CPC .......... G06F 8/65; G06F 8/61; G06F 9/44505; G06F 21/105; G06F 8/75; G06F 21/577; G06F 8/433; G06F 9/45529; G06F 8/63; G06F 9/45558
USPC .......................................................... 717/168
See application file for complete search history.

(56) References Cited

U.S. PATENT DOCUMENTS

| | | | |
|---|---|---|---|
| 8,578,361 B2 | 11/2013 | Cassapakis et al. | |
| 9,569,194 B2 | 2/2017 | Keith, Jr. | |
| 10,812,518 B1 * | 10/2020 | Belton, Jr. | ................ G06F 8/60 |
| 11,249,743 B2 * | 2/2022 | Cannon | .................. G06N 3/088 |
| 11,989,085 B2 * | 5/2024 | Dauber | ................. G06F 11/327 |
| 2005/0097216 A1 | 5/2005 | Zalzalah et al. | |

(Continued)

OTHER PUBLICATIONS

"What is End of Life (EOL) and End of Support (EOS)?"; Flexera. com website as captured by the Wayback Machine Internet Archive (web.archive.org) [full URL included in Ref.]; Sep. 7, 2024 (Year: 2024).*

*Primary Examiner* — Thuy Dao
(74) *Attorney, Agent, or Firm* — M&B IP Analysts, LLC

(57) ABSTRACT

A system and method for initiating a remediation action based on an End-Of-Life (EOL) date of a software component deployed in a cloud computing environment is presented. The method includes inspecting resources of a cloud computing environment for a plurality of software components, each software component deployed on at least a resource; detecting software components from the inspection of resources deployed in the cloud computing environment; generating a software bill of materials (SBOM) for the cloud computing environment based at least on a detected software component, wherein the SBOM includes an identifier of the software component; determining for the detected software component an end of life (EOL) date, wherein the EOL date is determined based on vendor data; applying a policy including a conditional rule to the EOL date; and initiating a remediation action for the detected software in response to determining that the conditional rule is satisfied.

20 Claims, 7 Drawing Sheets

(56) References Cited

U.S. PATENT DOCUMENTS

| | | | |
|---|---|---|---|
| 2013/0305239 A1* | 11/2013 | Traut | G06F 9/44536 |
| | | | 717/174 |
| 2021/0149658 A1* | 5/2021 | Cannon | G06N 3/04 |
| 2021/0264349 A1* | 8/2021 | Marappagounder | ......... |
| | | | G06Q 10/06313 |
| 2024/0289745 A1* | 8/2024 | Larkin | G06F 21/572 |
| 2025/0063063 A1* | 2/2025 | Tishbi | G06F 16/9024 |

\* cited by examiner

SYSTEM AND METHOD FOR DETECTING SOFTWARE LIFECYCLE VULNERABILITIES

TECHNICAL FIELD

The present disclosure relates generally to the field of detecting cybersecurity threats, and specifically utilizing End-Of-Life (EOL) dates of software components to detect cybersecurity threats.

BACKGROUND

Cloud computing environments, and computing environments in general, are the backbone of almost any human activity today. Whether providing support for financial institutions, aviation data and information, entertainment, communication, data storage or so many more, computing environments are ubiquitous.

As they create value, they attract malicious actors who wish to take that value for themselves. Valuable information, data, and computing resources such as processors and memory are ripe targets for attackers, and to thwart their efforts, the field of cybersecurity has emerged.

End of Life (EOL) is a phase in the life cycle of a software product with maintained releases. This means that the vendor or developer is no longer providing updates, patches, or technological support. Over a period of time, EOL software becomes more vulnerable to malicious actors, data breaches, cybersecurity risks, compatibility issues, etc. Due to lack of documentation and support, software maintenance and support can be difficult.

Therefore, it is advantageous for an organization to have an inventory of the EOL dates of each of their software products and utilize such EOL dates to detect and remediate such cybersecurity threats. Thus, it would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include inspecting resources of a cloud computing environment for a plurality of software components, each software component deployed on at least a resource. The method may also include detecting software components from the inspection of resources deployed in the cloud computing environment. The method may furthermore include generating a software bill of materials (SBOM) for the cloud computing environment based at least on a detected software component, where the SBOM includes an identifier of the software component. The method may in addition include determining for the detected software component an end of life (EOL) date, where the EOL date is determined based on vendor data. The method may moreover include applying a policy including a conditional rule to the EOL date. The method may also include initiating a remediation action for the detected software in response to determining that the conditional rule is satisfied. Other embodiments of this aspect include corresponding computer systems, apparatus, and computer programs recorded on one or more computer storage devices, each configured to perform the actions of the methods.

Implementations may include one or more of the following features. The method where inspecting resources further may include: assigning an inspector to inspect a resource, where the inspector is configured to detect a software component on the resource. The method may include: exposing the SBOM across a plurality of computing platforms utilizing an SBOM data exchange. The method may include: configuring an updater to periodically update SBOM metadata with vendor data. The method may include: configuring the updater to input an EOL date into the SBOM metadata for a software component of the SBOM. The method where applying a policy including a conditional rule to the EOL date further may include: initiating a mitigation action for a software component in response to determining that the software component has reached within a predetermined time of its EOL date. The method may include: initiating a remediation action based on a known vulnerability, security issue, and a combination thereof. The method may include: initiating the remediation action, where the remediation action includes any one of: generating an alert, updating a software component to its latest version, applying an update from a vendor, isolating the software component from its infrastructure, and any combination thereof. Implementations of the described techniques may include hardware, a method or process, or a computer tangible medium.

In one general aspect, non-transitory computer-readable medium may include one or more instructions that, when executed by one or more processors of a device, cause the device to: inspect resources of a cloud computing environment for a plurality of software components, each software component deployed on at least a resource; detect software components from the inspection of resources deployed in the cloud computing environment; generate a software bill of materials (SBOM) for the cloud computing environment based at least on a detected software component, where the SBOM includes an identifier of the software component; determine for the detected software component an end of life (EOL) date, where the EOL date is determined based on vendor data; apply a policy including a conditional rule to the EOL date; and initiate a remediation action for the detected software in response to determining that the conditional rule is satisfied. Other embodiments of this aspect include corresponding computer systems, apparatus, and computer programs recorded on one or more computer storage devices, each configured to perform the actions of the methods.

In one general aspect, system may include one or more processors configured to: inspect resources of a cloud computing environment for a plurality of software components, each software component deployed on at least a resource. The system may furthermore detect software components from the inspection of resources deployed in the cloud computing environment. The system may in addition generate a software bill of materials (SBOM) for the cloud computing environment based at least on a detected software component, where the SBOM includes an identifier of the software component.

The system may moreover determine for the detected software component an end of life (EOL) date, where the EOL date is determined based on vendor data. The system may also apply a policy including a conditional rule to the EOL date. The system may furthermore initiate a remediation action for the detected software in response to determining that the conditional rule is satisfied. Other embodiments of this aspect include corresponding computer systems, apparatus, and computer programs recorded on one or more computer storage devices, each configured to perform the actions of the methods.

Implementations may include one or more of the following features. The system where the one or more processors, when inspecting resources, are configured to: assign an inspector to inspect a resource, where the inspector is configured to detect a software component on the resource. The system where the one or more processors are further configured to: expose the SBOM across a plurality of computing platforms utilizing an SBOM data exchange. The system where the one or more processors are further configured to: configure an updater to periodically update SBOM metadata with vendor data. The system where the one or more processors are further configured to: configure the updater to input an EOL date into the SBOM metadata for a software component of the SBOM. The system where the one or more processors, when applying a policy a conditional rule to the EOL date further may include: initiate a mitigation action for a software component in response to determining that the software component has reached within a predetermined time of its EOL date. The system where the one or more processors are further configured to: initiate a remediation action based on a known vulnerability, security issue, and a combination thereof. The system where the one or more processors are further configured to: initiate the remediation action, where the remediation action includes any one of: generate an alert, updating a software component to its latest version, applying an update from a vendor, isolating the software component from its infrastructure, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
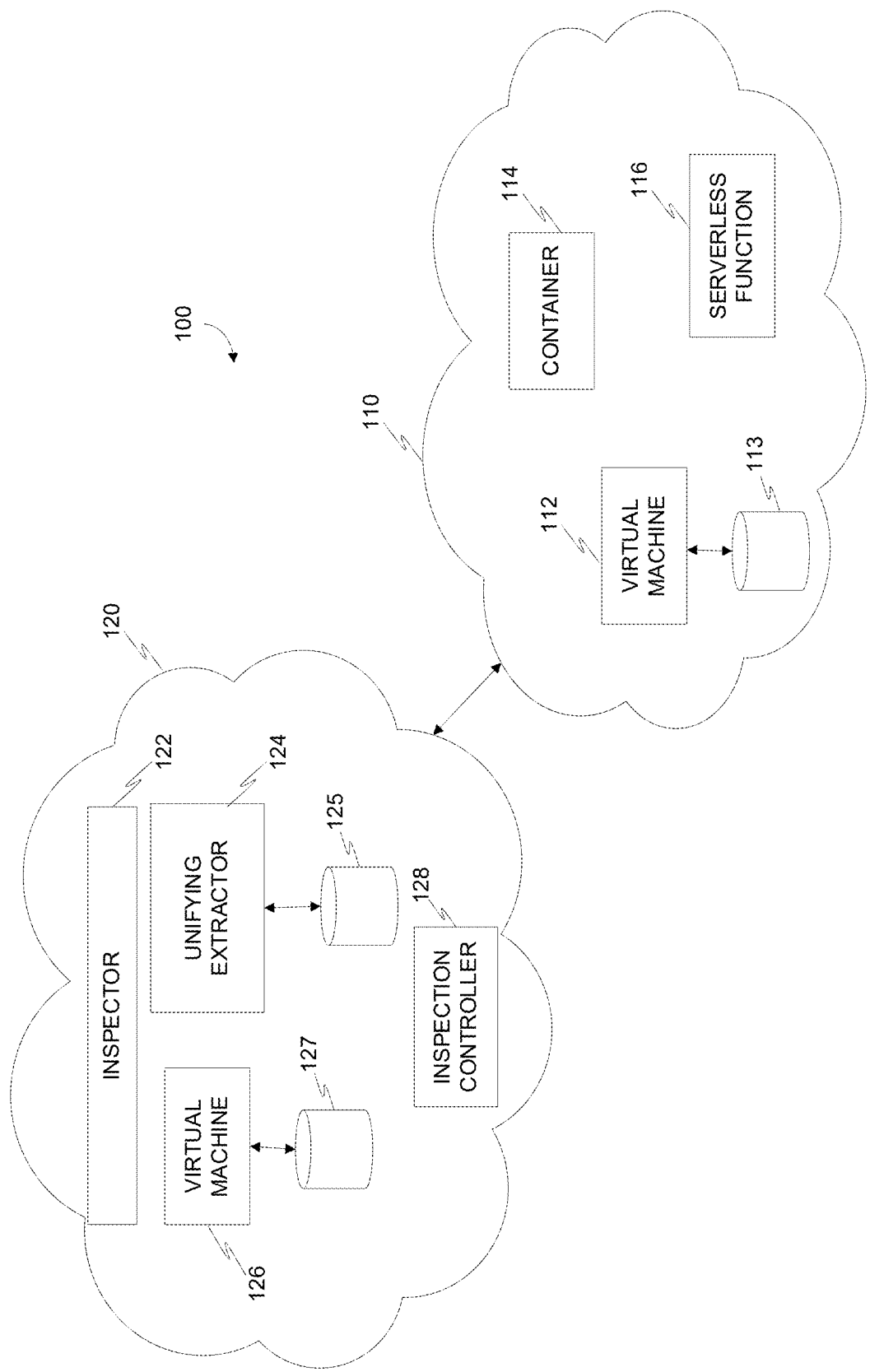
FIG. 1 is an example schematic illustration of a computing environment and an inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The various disclosed embodiments include a method and system for detecting software life cycle vulnerabilities in a cloud computing environment.

According to the disclosed embodiments, resources are inspected for the detection of a software component. In an embodiment, a software bill-of-materials (SBOM) is generated based on a detected software component. In some embodiments, an End-Of-Life (EOL) date is determined for the detected software component. In most embodiments, a policy including a conditional rule is applied to the EOL date. In an embodiment a remediation action is initiated for the detected software component that has satisfied a conditional rule.

In an embodiment, the inventory is a software bill-of-materials (SBOM) which is generated based on a predefined data schema, such as SPDX, CycloneDX®, PCE, and the like. In some embodiments, a predefined data schema includes a plurality of data fields stored, for example, as a JSON file. This is advantageous as it allows the utilization of a database management service to search for objects in the inventory.

FIG. 1 is an example schematic illustration 100 of a computing environment and an inspection environment, utilized to describe an embodiment. In an embodiment, a cloud computing environment 110 is implemented as, for example, a virtual private cloud (VPC), a virtual network (VNet), combinations thereof, and the like. In certain embodiments, the cloud computing environment is deployed on a cloud computing infrastructure. Examples of cloud computing infrastructures include Amazon® Web Services (AWS), Google® Cloud Platform (GCP), Microsoft® Azure, and the like. In certain embodiments, the computing environment 110 is a hybrid environment, including a cloud computing environment and a local networked computing environment.

In an embodiment, the cloud computing environment 110 includes a plurality of resources and principals. In certain embodiments, a resource is an entity in a computing environment, and is, for example, a virtual machine, a bare metal machine, a software container, a serverless function, a cloud service, a provisioned computational resource (e.g., a processor, a memory, a storage, a combination thereof, and the like), a workload, a combination thereof, and the like.

In some embodiments, a principal is an entity in a computing environment which is authorized to initiate an action in the computing environment, act on a resource, assume a role of another principal, a combination thereof, and the like. In an embodiment, a principal is, for example, a user account, a service account, a role, a combination thereof, and the like.

For example, in an embodiment, the cloud computing environment 110 includes a virtual machine 112, a software container 114, and a serverless function 116. In some embodiments, a serverless function 116 is implemented as an Amazon® Lambda. In an embodiment, a software container 114 is implemented utilizing a Docker® engine, a Kubernetes® platform, combinations thereof, and the like.

In an embodiment, the virtual machine 112 is implemented utilizing Oracle® VirtualBox®. In certain embodiments, the virtual machine 112 provisions a disk 113, for example by provisioning physical storage addresses and mapping each physical storage address to a virtual storage address, and provisioning the virtual storage addresses to the virtual machine 112. In some embodiments, a virtual machine 112 provisions a plurality of disks.

In certain embodiments, the cloud computing environment 110 is monitored by an inspection environment 120, configured to detect cybersecurity objects, cybersecurity threats, vulnerabilities, exposures, misconfigurations, combinations thereof, and the like. In an embodiment, the inspection environment 120 is further configured to detect software components, such as a software application, a library, a binary, a binary version, a dependency, a version setting, a registry file, a license, a vendor identifier, an operating system (OS) package, an open source library, a combination thereof, and the like.

In an embodiment, the inspection environment 120 is implemented as a cloud computing environment. In some embodiments, the inspection environment 120, a portion thereof, and the like, are implemented in the cloud computing environment 110.

In some embodiments, the inspection environment 120 includes an inspector 122, an inspector controller 128, a unifying extractor 124, and a workload, such as virtual machine 126. In some embodiments, the inspector 122 is implemented as a workload, a plurality of workloads, and the like, which are configured to detect a cybersecurity object, a cybersecurity threat, a vulnerability, an exposure, a misconfiguration, a software component, a software application, a library, a binary, a binary version, a dependency, a version setting, a registry file, a license, a vendor identifier, an operating system (OS) package, an open source library, a combination thereof, and the like.

In an embodiment, a unifying extractor 124 is configured to extract, from each of a plurality of workloads, cybersecurity objects and the like, for inspection by an inspector. In some embodiments, the plurality of workloads include a virtual machine, a software container, a serverless function, a combination thereof, and the like. In some embodiments, the unifying extractor 124 is configured to extract data from a workload, and store the data, for example based on a predefined data schema, in a database 125.

In some embodiments, the database 125 is implemented as a graph database. In such embodiments, the data schema incudes, for example, a data schema, a data template, and the like, for various entities in a computing environment. For example, in an embodiment, a data schema includes a data template, based on a which a representation is generated in the database 125 of an entity deployed in the cloud computing environment 110.

In some embodiments, the database 125 is a graph database, such as Neo4j®, and entities, such as resources, principals, and the like, are represented as nodes in the graph database. This is advantageous, as having a unified data template, data schema, and the like, to represent various cloud computing environments, allows a more compact representation. For example, there is no need to store a first data template for a virtual machine, and a second data template for a serverless function, when instead a single data template is utilized for representing a resource.

Furthermore, in certain embodiments, where multiple cloud computing environments are deployed and represented, having a single data schema used to represent each different cloud computing environment (e.g., AWS, GCP, etc.) is advantageous, likewise. This reduces the amount of data schemas, data templates, and the like, required to represent a computing environment, and further allows to manipulate such representations using a unified instruction, as opposed to requiring generating different instructions for different types of data structures.

In some embodiments, a data template, data schema, and the like, includes a plurality of data fields. Each data field is populated with data (i.e., data values), according to an embodiment, extracted for example by a unifying extractor 124.

In some embodiments, a virtual machine 126 (or other workload) is spun up, provisioned, and the like. In certain embodiments, the virtual machine 126 is assigned a disk 127. In an embodiment, the disk 127 is an inspectable disk. In certain embodiments, the disk is generated by cloning the disk 113 of the virtual machine 112 in the cloud computing environment 110.

For example, in an embodiment, a clone of the disk 113 is generated as a disk 127 in an inspection environment 120, in the cloud computing environment 110, and the like. In some embodiments, an inspectable disk 127 is generated utilizing a snapshot, a disk copy, a disk clone, a combination thereof, and the like. In some embodiments, disk cloning is advantageous as cloning a disk utilizes less computational resources than, for example, generating a snapshot. For example, under some cloud infrastructure platforms, such as Microsoft® Azure, generating a snapshot requires storing the snapshot in a storage of the cloud computing environment. However, in an embodiment, generating a disk clone generates a pointer that points to the same data, therefore data is not duplicated, requiring less storage.

In an embodiment, the inspector 122 is configured to inspect the inspectable disk 127 for a cybersecurity object, a cybersecurity threat, a vulnerability, an exposure, a misconfiguration, a software component, a software application, a library, a binary, a binary version, a dependency, a version setting, a registry file, a license, a vendor identifier, an operating system (OS) package, an open source library, a combination thereof, and the like.

In an embodiment, the inspection controller 128 is deployed in the inspection environment 120. In some embodiments, the inspection controller 128 is configured to detect software in a cloud computing environment 110 from an inventory. In certain embodiments, the inspection controller 128 is configured to generate EOL data for the detected software. In certain embodiments, the inspection controller 128 is configured to detect software that has reached its EOL based on the EOL data. In some embodiments, the inspection controller 128 is configured to initiate remediation actions for software that has reached its EOL.

Figure 2:
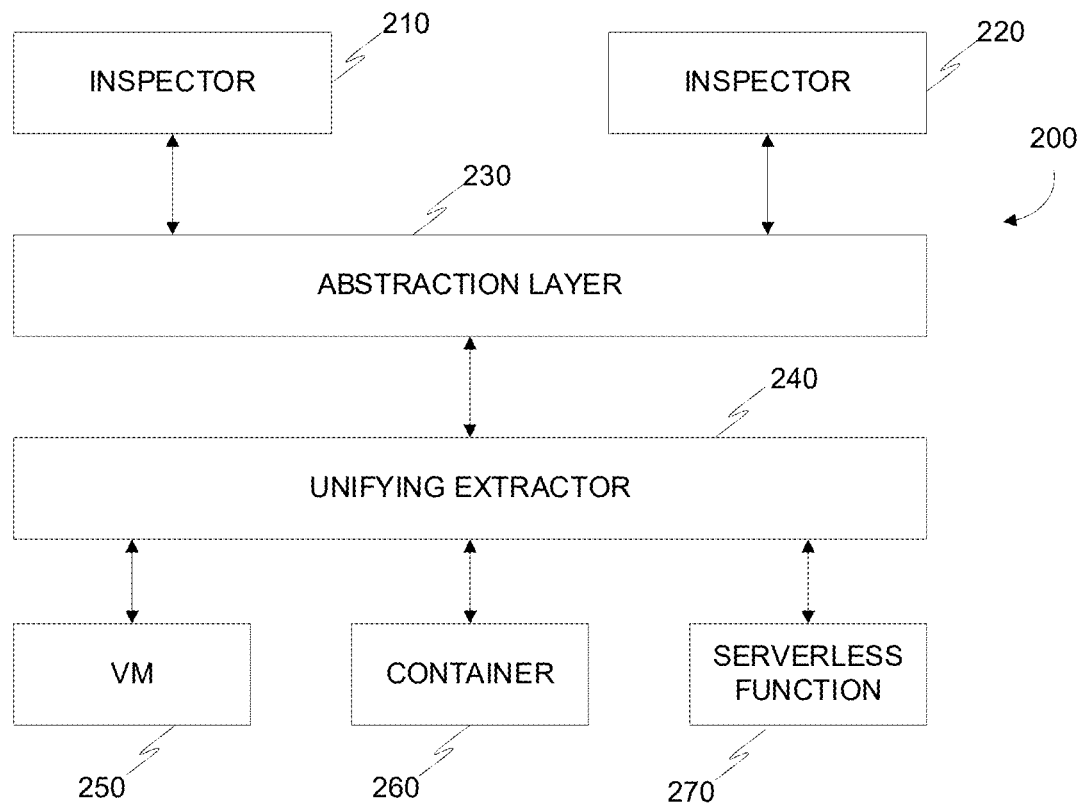
FIG. 2 is an example schematic illustration of a software component inspector, implemented in accordance with an embodiment.

FIG. 2 is an example schematic illustration 200 of a software component inspector, implemented in accordance with an embodiment. In some embodiments, the inspector is a unified inspector, configured to inspect multiple types of workloads.

In an embodiment, a unifying extractor 240 is configured to access a plurality of resources. In some embodiments, the unifying extractor 240 is configured to read data from a virtual machine 250, a software container 260, a serverless function 270, a combination thereof, and the like. In certain embodiments, the unifying extractor 240 is configured to extract data from various workloads and store the extracted data in an abstraction layer 230.

In some embodiments, the abstraction layer 230 is generated based on a data schema, a data template, a combination thereof, and the like. For example, in an embodiment, the abstraction layer 230 includes data extracted from a plurality of different resources, and stored based on a shared data schema, for example stored in a database, such as a graph database.

In certain embodiments, a plurality of inspectors, such as inspector 210 and inspector 220, are configured to read data from the abstraction layer 230, and detect a predefined object, a predefined code, a predefined software component, a combination thereof, and the like.

In an embodiment, an inspector, such as inspector 210, is configured to inspect the abstraction layer 230, an inspectable disk, a combination thereof, and the like. In some embodiments, the inspector 210 is configured to inspect an inspectable disk, such as a disk generated from a clone of an original disk, wherein the original disk is deployed in a cloud computing environment.

In some embodiments, the inspector 210 is configured to detect various software components, for example such as detailed above, and store an identifier for each software component. In an embodiment, the identifier of each software component is stored together with an identifier of the workload, in a database, in an abstraction layer 230, a combination thereof, and the like.

In certain embodiments, a plurality of identifiers, each identifier corresponding to a software component, is utilized to generate a software bill-of-materials (SBOM). In some embodiments, the plurality of identifiers is stored in a standard format, such as SPDX, CycloneDX®, CPE, and the like. In certain embodiments, the standard format is expressed in a JSON data schema, XML data schema, a protocol buffer, combinations thereof, and the like.

In an embodiment, the SBOM further includes cloud services, microservices, appliances, applications, code objects, infrastructure as code files, orchestration instructions, combinations thereof, and the like, which are detected, for example by an inspector configured to so detect, in the cloud computing environment.

Figure 3:
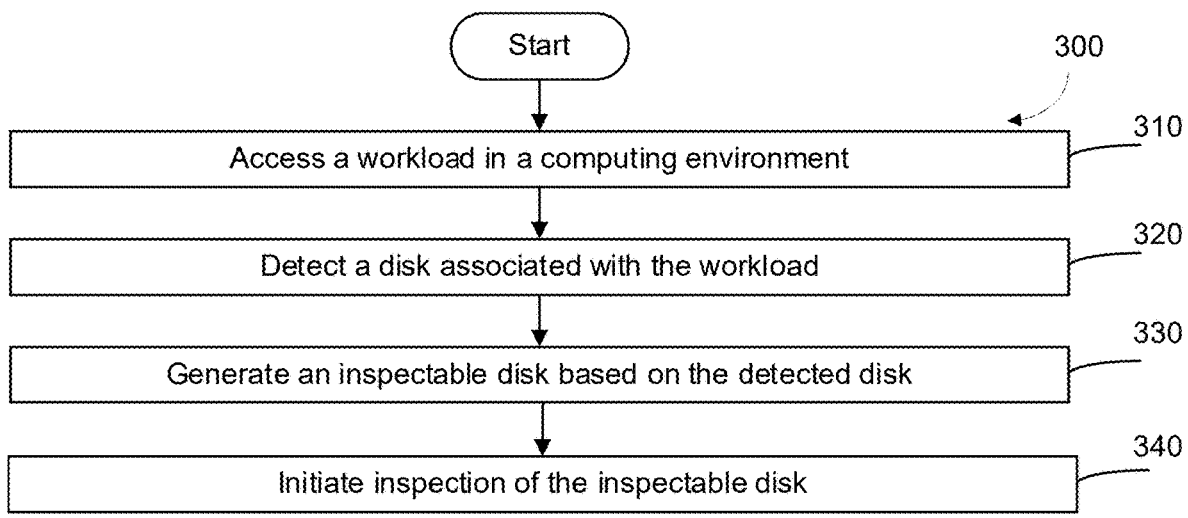
FIG. 3 is an example flowchart of a method for inspecting a disk of a workload deployed in a cloud computing environment, implemented in accordance with an embodiment.

FIG. 3 is an example flowchart 300 of a method for inspecting a disk of a workload deployed in a cloud computing environment, implemented in accordance with an embodiment.

At 310, a workload is accessed. In an embodiment, the workload is deployed in a computing environment. In some embodiments, a plurality of workloads are deployed in a computing environment. In an embodiment, the computing environment is a cloud computing environment, deployed on a cloud computing infrastructure, an on-premises environment deployed as a physical network, a hybrid computing environment, a combination thereof, and the like.

In certain embodiments, a workload is a resource deployed in a cloud computing environment. For example, according to an embodiment, a workload is a virtual machine, software container, a serverless function, a combination thereof, and the like.

In some embodiments, an inspection controller is configured to initiate the accessing of a workload. In certain embodiments, an inspection controller is a workload configured to assume a role, a service account, and the like, in a computing environment in which the accessed workload is deployed.

At 320, a disk is detected. In an embodiment, the disk is detected by accessing the workload, and determining that the workload is provisioning a disk. For example, in an embodiment, a software container provisions a disk by generating a persistent volume claim (PVC). In an embodiment, in response to receiving a PVC, a software container provisions storage, for example by generating a persistent volume (PV) and assigning the PV.

In an embodiment, a disk is associated with a virtual machine. In certain embodiments, a disk associated with a virtual machine includes a plurality of virtual addresses, each address mapped to a physical address, for example of a block storage. In some embodiments, multiple layers of virtualization are utilized, such that a first virtual address is directed to a second virtual address, and so on, until a penultimate virtual address is directed to a physical address.

At 330, an inspectable disk is generated. In an embodiment, the inspectable disk is generated based on the detected disk. In some embodiments, the inspectable disk is generated in the same computing environment as the detected disk. In certain embodiments, the inspectable disk is generated in a different computing environment from the detected disk.

In an embodiment, the inspectable disk is generated by initiating a cloning of the detected disk. For example, in an embodiment, a disk clone is initiated by executing an instruction in a cloud computing environment which generates a pointer that points to the original disk.

In some embodiments, the cloud computing environment, cloud computing infrastructure, and the like, is configured to copy the contents of the detected disk into the cloned disk at a later time than a time when the cloned disk is initiated. In order to provide immediate access to the data, the pointer is generated, which allows access to the cloned disk, according to an embodiment.

In certain embodiments, once all data is copied to the cloned disk, the pointer is reconfigured to point to the copied disk, which is now the cloned disk. However, according to an embodiment, an inspection of the cloned disk is performed prior to the copying being finished, thus allowing to release the resources of the copied disk.

At 340, inspection is initiated. In an embodiment, inspection is initiated for the inspectable disk. In some embodiments, the inspectable disk is inspected by an inspector, configured to detect a cybersecurity object, a cybersecurity threat, a vulnerability, an exposure, a misconfiguration, a software component, a software application, a library, a binary, a binary version, a dependency, a version setting, a registry file, a license, a vendor identifier, an operating system (OS) package, an open source library, a combination thereof, and the like.

In some embodiments, a cybersecurity object is, for example, a hash, a code object, a password, a certificate, a cryptographic key, a signature generated based on software code, a combination thereof, and the like.

In certain embodiments, inspection of the inspectable disk includes detecting identifiers, metadata, and the like, of software components. In some embodiments, an identifier, metadata, a combination thereof, and the like, is stored based on a predefined data schema (e.g., SPDX) to generate an SBOM, a software inventory, a combination thereof, and the like.

Figure 4:
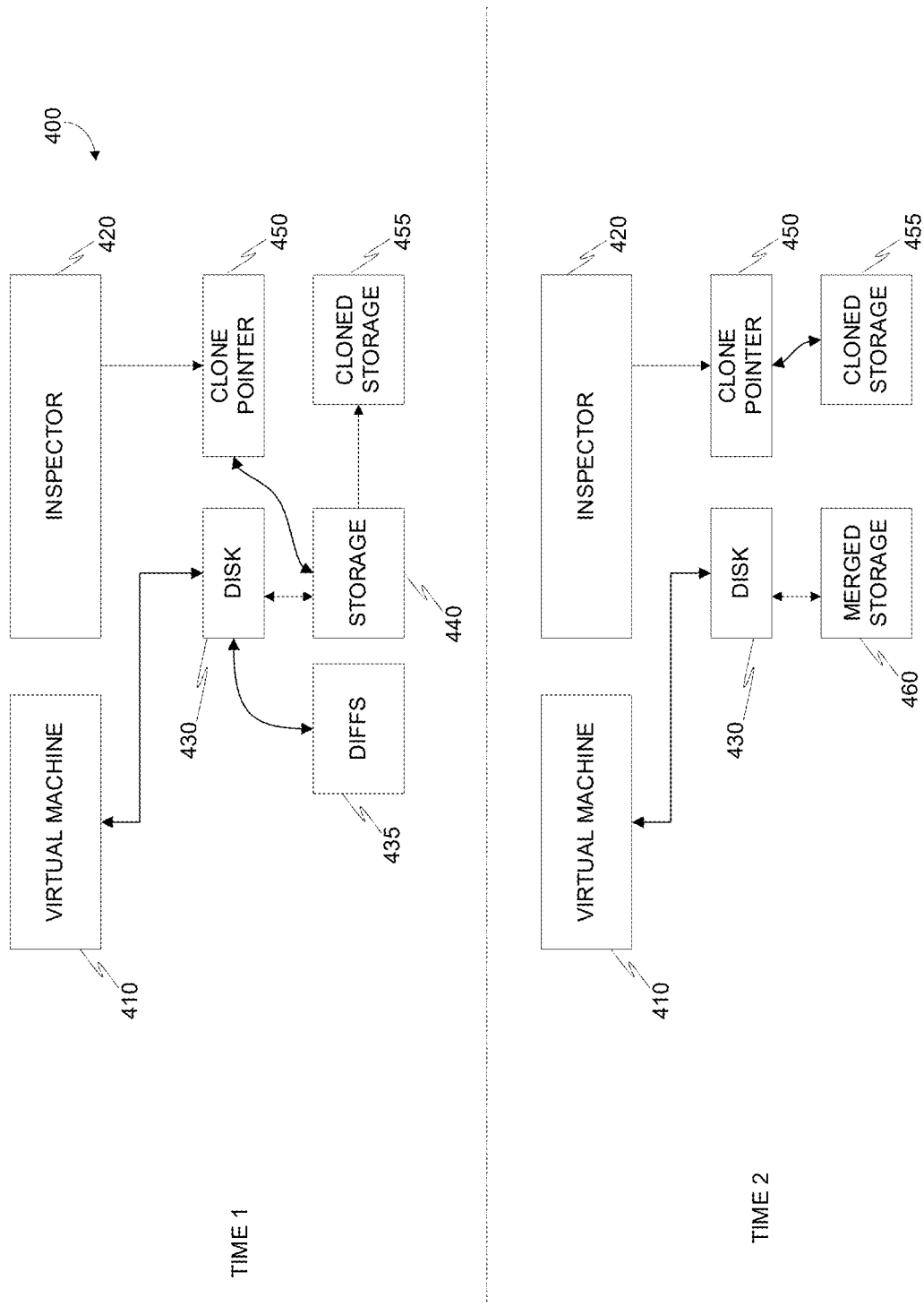
FIG. 4 is an example timeline diagram of an inspectable disk generation utilizing disk cloning, utilized to describe an embodiment.

FIG. 4 is an example timeline diagram 400 of an inspectable disk generation utilizing disk cloning, utilized to describe an embodiment. According to an embodiment, at a first time (Time 1), a disk 430 is cloned. In an embodiment, the disk 430 is associated, provisioned, and the like to a virtual machine 410. In some embodiments, the virtual machine 410 is deployed in a cloud computing environment.

In certain embodiments, the disk 430 includes a plurality of virtual addresses, such that each virtual address is assigned to a physical address, such as directed to a physical storage block, of a storage 440.

In an embodiment, a cloned disk is generated by generating a pointer 450, which points to a storage address of the storage 440. By pointing the pointer 450 to the storage 440, the cloned disk is immediately accessible.

In an embodiment, the virtual machine 410 is configured to continuously write to the disk 430. In such embodiments, the disk 430 is configured to store certain disk operations, such as disk writes as diffs (i.e., differences) in a diff storage 435.

This is advantageous as it allows the virtual machine 410 to continuously write and otherwise access the disk, while also maintaining data at a point in time (i.e., Time 1) when the disk 430 was cloned. In other words, according to an embodiment, when an inspector 420 is configured to inspect the cloned disk, the inspector 420 is configured to access the cloned disk through the clone pointer 450, which allows access to data which was present on the disk at the time of the cloning.

However, when the virtual machine 410 accesses the disk 430, the virtual machine also accesses the diff storage 435, which allows the virtual machine 410 to always view the up to date data on the disk 430.

In certain embodiments, the data stored on the disk 430 at the time (Time 1) of cloning is copied into a cloned storage 455. In some embodiments, copying the data occurs over a period of time. This is advantageous as it allows, for example, the cloud computing environment to distribute IOPS (I/O operations per second) over time, which is especially advantageous where certain cloud computing infrastructures include an IOPS limit.

Therefore, according to an embodiment, at a second point in time (Time 2), the clone pointer 450 points to a cloned storage 455. In certain embodiments, the clone pointer 450 is configured to point to the cloned storage 455 once all data from the disk 430 at the first time (Time 1) is cloned into the cloned storage 455.

In certain embodiments, once cloning is complete, the storage 440 and diff storage 435 are merged to a merged storage 460. At this point in time the cloned storage 455 and the merged storage 460 are completely separated from each other.

Disk cloning is advantageous as it allows the inspector to inspect a cloned disk through the cloned pointer 450, while the data from the original disk 430 is still being copied to the actual cloned disk. In an embodiment, where inspection concludes prior to the second time (Time 2), the cloned disk is released. This allows reducing IOPS, by not having to copy the entire contents of the original disk 430.

Figure 5:
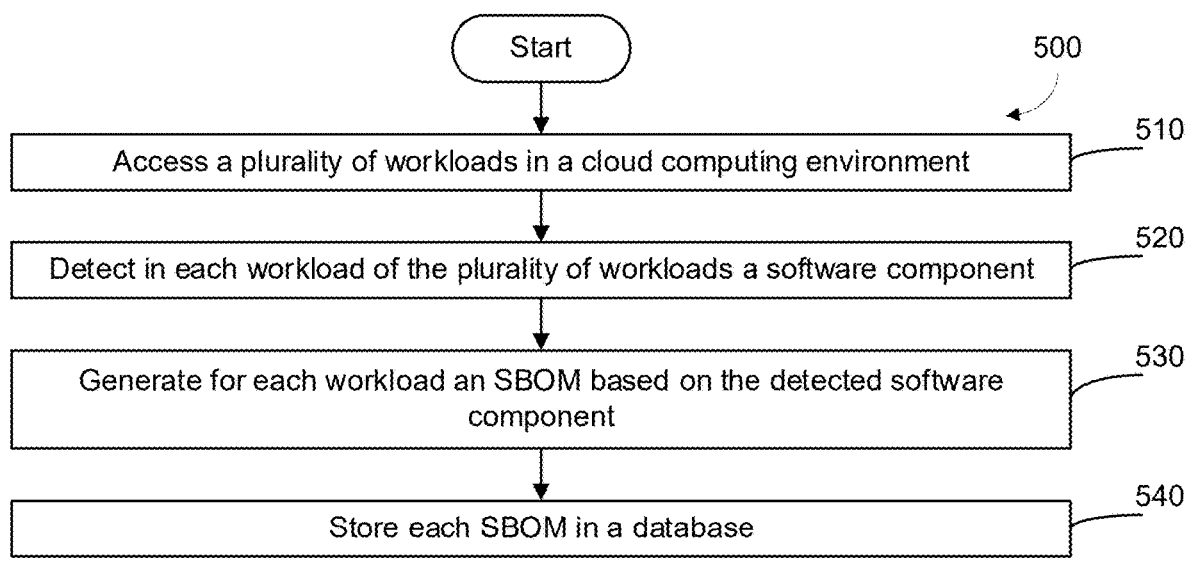
FIG. 5 is an example flowchart of a method for generating a software application inventory, implemented in accordance with an embodiment.

FIG. 5 is an example flowchart 500 of a method for generating a software application inventory, implemented in accordance with an embodiment.

At 510, a plurality of workloads are accessed. In an embodiment, the plurality of workloads are deployed in a cloud computing environment, in an on-premises environment, in a hybrid environment, in a combination thereof, and the like.

In certain embodiments, a workload is a resource, such as a virtual machine, a software container, a serverless function, a combination thereof, and the like.

In an embodiment, accessing a workload includes initiating inspection of the workload. For example, according to an embodiment, initiating inspection of a workload includes generating an inspectable disk based on a disk, a storage, a combination thereof, and the like.

In an embodiment, the disk includes storage provisioned to the workload, such as a storage addresses assigned to a virtual machine, a persistent volume assigned by utilizing a persistent volume claim of a software container, combinations thereof, and the like.

In some embodiments, each workload of the plurality of workloads is accessed, for example periodically. In certain embodiments, the workloads are accessed based on predefined time intervals (e.g., every hour, every 12 hours, once per day, etc.).

At 520, a software component is detected. In an embodiment, the software component is any one of: a software application, a library, a binary, a binary version, a dependency, a version setting, a registry file, a license, a vendor identifier, an operating system (OS) package, an open source library, a combination thereof, and the like. In an embodiment, the software component is detected utilizing inspection.

In some embodiments, metadata of the software component is further detected. Metadata is, according to an embodiment, a version identifier, a source identifier, an author identifier, a combination thereof, and the like.

According to an embodiment, a software component is detected by an inspector configured to detect a particular software component, a plurality of software components, a cybersecurity object, a cybersecurity threat, combinations thereof, and the like.

In certain embodiments, an inspector is configured to detect a predetermined type of software component (e.g., operating system). In other embodiments, an inspector is configured to detect a predetermined type of software component (e.g., operating system) from a predetermined type of workload (e.g., virtual machine).

At 530, an inventory is generated. In an embodiment, the inventory is an SBOM (i.e., software bill-of-materials). In some embodiments, the SBOM is stored based on a predetermined data schema, for example based on a JSON data schema, an XML data schema, and the like. In certain embodiments, the data schema is specified by a standard such as SPDX, CycloneDX®, PDE, and the like.

At 540, the inventory is stored. In some embodiments, the inventory, SBOM, and the like, is stored on a database. In certain embodiments, the database is a columnar database, relational database, and the like. In an embodiment, an inspector is further configured to detect cloud entities, identities, cloud services, combinations thereof, metadata thereof, and the like. In such embodiments, the SBOM further includes findings generated based on the inspector detection.

In an embodiment, the inventory includes a version number. For example, in some embodiments, the version number is a timestamp. In some embodiments, an SBOM, inventory, and the like, is generated at a first time and at a second time which is after the first time. In some embodiments, an SBOM diff is stored, which includes findings (e.g., software components) detected at the second time and not detected at the first time.

This is advantageous, according to an embodiment, as it allows to reduce the amount of storage required to store the information generated from a plurality of SBOM inspections. Duplicated data, for example, is therefore stored only once, according to an embodiment.

In some embodiments, an SBOM diff includes a version number, such as a timestamp. In some embodiments, an SBOM is generated at a first time, an SBOM diff is generated at a second time (after the first time), and another SBOM is generated at a third time (after the second time). In certain embodiments, storage of the SBOM alternates between storing an entire SBOM at a time interval and storing a diff at a later time interval.

According to an embodiment, the SBOM is stored in a searchable database. In some embodiments, the database includes a control. In an embodiment, a control is a predefined policy, query, combination thereof, and the like. For example, in an embodiment, a control includes a query to detect a predetermined software component type. In an embodiment, a policy is applied on the query, such that when the query is executed on the database storing thereon the SBOM, and a result returns as true (or returns as a value other than false, null, and the like), then an action is initiated.

In an embodiment, the action is a mitigation action. For example, according to an embodiment, a mitigation action includes generating a notification, isolating a workload corresponding to an identifier received as a result of executing the query, sandboxing a workload, revoking access to a workload, revoking access from a workload, a combination thereof, and the like. In some embodiments, the mitigation action includes generating an alert, generating a severity score for an alert, updating a severity score for an existing alert, and the like.

In certain embodiments, the SBOM database is periodically queried based on queries generated from a vulnerability database, such as the Common Vulnerabilities and Exposure (CVE) database. For example, in an embodiment, a CVE entry includes a software identifier. In an embodiment, the software identifier of the CVE entry is utilized in a query directed at a database storing thereon an SBOM of a cloud computing environment.

In certain embodiments, the query is configured to return as a result an identifier of a workload having deployed thereon a software component corresponding to the software identifier of the CVE entry. This is advantageous as it allows the detection of cybersecurity threats in an efficient manner.

Furthermore, having an up to date SBOM provides compliance to certain requirements. For example, a government requiring a vendor to show an SBOM in order to enhance the security of a software supply chain is beneficial, as it allows the rapid response of incidents such as the SolarWinds® hack of 2019.

In an embodiment, the SBOM includes for each detected software component, a version identifier, a stream identifier, a combination thereof, and the like. For example, in an embodiment, Windows® is a software component having a stream identifier of "10", "11" "8", etc. Windows stream 10 has version identifiers of "1511", "1607", "1703" etc. According to an embodiment, a stream, a version, and the like, is associated with an end-of-life date, as discussed in more detail below.

Figure 6:
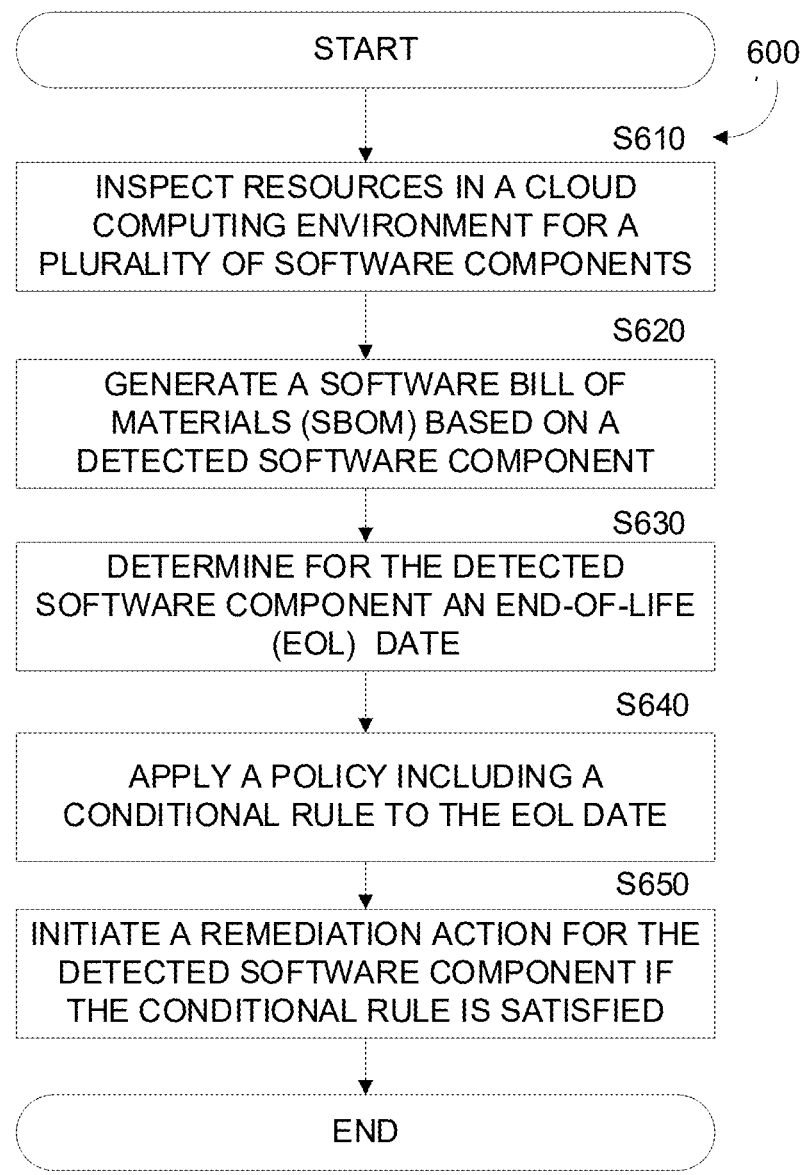
FIG. 6 is an example flowchart of a method for initiating a remediation action based on End-Of-Life dates of detected software components, implemented in accordance with an embodiment.

FIG. 6 is an example flowchart 600 of a method for initiating a remediation action based on End-Of-Life (EOL) dates of detected software components, implemented in accordance with an embodiment.

Software components that have reached their EOL are no longer supported by security patches, which make them more prone to vulnerabilities and attacks from malicious actors. Identifying software components that have reached their EOL is challenging as software providers maintain various EOL cycles and policies and it is difficult to track this information. Further, software components have different EOL dates based on the version of the software component. Thus, it is time consuming and laborious to check each system to determine which version of the software component is in use. Therefore, it is advantageous to utilize an inventory (e.g., SBOM) of deployed software components including each software component's current version for determining their EOL dates as this allows for a more rapid response in initiating a remediation action for components that have reached their EOL. Utilizing an SBOM reduces the need to check each software component of each workload deployed in a computing environment, therefore reducing querying processing, for example.

At S610, a computing environment is inspected. In an embodiment, inspecting a computing environment includes inspecting a plurality of resources deployed in the computing environment. According to an embodiment, a resource is a virtual machine, a software container, a serverless function, a combination thereof, and the like.

In various embodiments, resources in a cloud computing environment are inspected for a plurality of software components. In some embodiments, each software component is deployed on a resource. In certain embodiments, an inspection controller is configured to initiate inspection of resources in a cloud computing environment for a plurality of software components.

In an embodiment, the inspection controller is configured to assign an inspector to inspect a resource, wherein the inspector is configured to detect a software component on the resource, a disk associated with the resource, etc.

In an embodiment, cloud management tools such as Azure® Monitor, AWS® CloudTrail, and Google® Cloud Operations Suite are utilized in inspection of resources in the cloud computing environment. In some embodiments, the inspection controller is configured to track resource activity, log resource activity, etc., across the cloud computing environment. In an embodiment, a software component is detected utilizing an identifier of such a software, for example, in an event record, in a log, etc.

In some embodiments, a software component includes a software application, a library, a binary, a binary version, a dependency, a version setting, a registry file, a license, a vendor identifier, an operating system (OS) package, an open source library, a product key, a combination thereof, and the like.

At S620, a software bill of materials (SBOM) is generated. In various embodiments, an SBOM is generated based on a detected software component. In some embodiments, the inspection controller is configured to generate an SBOM based on the detected software components of the cloud computing environment. In various embodiments, an SBOM is an inventory of the detected software components.

In some embodiments, an SBOM is an inventory of all libraries, modules, dependencies, tools, framework, a combination thereof, and the like, that are used in deploying a software component. In an embodiment, an SBOM includes metadata of software identifiers, versions, component hashes, latest patches, first release dates, end of general support dates, end of extended support dates, in service times, inactive stream data, stream prefixes, EOL dates, licensing information, source of the component, a combination thereof, and the like.

In an embodiment, a version is a release of a specific state of a software component, denoted by a unique version identifier (e.g. v1.0, 2.4). In various embodiments, a stream is a continuous flow of updates within a specific software component. In an embodiment a stream is a specific version range of a software component.

In an embodiment, an SBOM data exchange facilitates the sharing of the SBOM across various platforms and tools. In certain embodiments, the SBOM data exchange utilizes standardized formats such as SPDX®, CycloneDX®, and SWID Tag, to provide a consistent format for sharing the SBOM data. In some embodiments, SPDX®, is configured to utilize file formats including JSON, XML, and YML, for sharing the SBOM data. In an embodiment, CycloneDX®, utilizes an XML, JSON file, a combination thereof, to structure its SBOM data.

In various embodiments, an SBOM is stored in a database. In an embodiment, the database is a columnar database, (i.e. stores data in column format), a relational database (i.e. stores data in table format, including rows, and columns), and the like. In certain embodiments, an SBOM is stored in a searchable database, which allows for the querying of specific metadata of software components such as a software version, first release date, end of general support dates, etc.

At S630, an End-Of-Life (EOL) date is determined. In certain embodiments, an EOL date is determined for each detected software component of the SBOM.

In an embodiment, an EOL date of a software component is the end date of the functionality and security maintenance of the respective software component by its vendor. In some embodiments, an EOL date is determined based on vendor data. In some embodiments, vendor data includes any data related to the software components of the SBOM that is extracted from an EOL source. In various embodiments, EOL sources include official vendor webpages, official vendor publications, customer environments, reliable third party websites, reliable third party publications, a combination thereof, and the like. In an embodiment, vendor data includes EOL dates of software versions, latest versions of software components, version release dates, current version streams, a combination thereof, and the like.

In some embodiments, the inspection controller is configured to utilize an updater (e.g. Golang updater, Python® updater) to periodically update the SBOM metadata with vendor data. In an embodiment, the updater is configured to input the SBOM metadata with an EOL date for a specific version of a software component. For example, in an embodiment the updater is configured to update the EOL date of the software component "Rabbit AB, version 3.7", of the SBOM to "June 2022" based on extracted vendor data.

In an embodiment, the updater is configured to utilize a crawler that is configured to access various EOL sources (e.g., vendor websites) to obtain vendor data. In some embodiments, the updater is configured to utilize a scraper to extract vendor data from the identified EOL sources (e.g., vendor websites, online publications, etc.) from the crawler. In an embodiment, the scraper extracts the vendor data by parsing pieces of vendor data from EOL sources.

In an embodiment, the updater is configured to input the SBOM metadata with the latest version of a software component. In an embodiment, the updater is configured to utilize a crawler, a scraper, a combination thereof, and the like to extract vendor data (e.g., software component versions, software component streams) from various EOL sources. In some embodiments, in response to detecting software component versions a plurality of times across multiple EOL sources, the updater is configured to update the SBOM metadata with the latest software component version.

In certain embodiments, the updater is configured to update the SBOM metadata with the latest version of a software component based on a current version stream, unless the entire stream reaches its EOL date. In an embodiment, the latest version of the next non-EOL stream will be updated, in response to the current version stream reaching its EOL date.

At S640, a policy is applied. In various embodiments, a policy is applied to the EOL date of the detected software component. In some embodiments, a policy including a conditional rule, a combination thereof, and the like, is applied to the EOL date of the detected software component. In an embodiment, a policy is implemented to protect the software components that have reached their EOL phase, as such software components are more susceptible to threats and attacks as they are no longer provided with software patches from their vendors.

For example, in an embodiment, the inspection controller is configured to implement a policy for initiating a mitigation action for a software component that has reached within a predetermined time of its EOL date. In an embodiment, for example, the inspection controller is configured to implement a conditional rule of upgrading to the latest version of a software component (within the same stream, with another stream, etc.), in response to the detection that the software component has reached its EOL date.

In an embodiment, for example, the inspection controller is configured to implement a conditional rule of isolating a software component from its infrastructure in response to the software component reaching its EOL date. An example of a conditional rule, in an embodiment is, in response to the software component "Rabbit AB, version 2.4", reaching its EOL date of "Nov. 7, 2024", the inspection controller is configured to isolate "Rabbit AB, version 2.4" from the computing infrastructure, computing environment, etc., on which the software component is deployed.

In an embodiment, applying a policy on an SBOM including EOL dates for software components is advantageous as applying the policy on an SBOM requires less resources than applying the policy on a representation, such as a security database, which includes duplicated data. For example, a security database including a representation of a computing environment includes, in an embodiment, a representation of a first software container having a first application, and of a second software container having also the first application. Applying a policy on the security database therefore requires applying the policy (e.g., checking a conditional rule) on each representation.

By applying the policy on an SBOM instead, the policy only needs to be applied on the single representation of the first application, rather than on multiple redundant representations. Therefore, application of a policy in this manner reduces compute resources required to apply such a policy.

At S650, a remediation action is initiated. In an embodiment, a remediation action is initiated for a detected software component in response to a conditional rule being satisfied, being unsatisfied, etc. In various embodiments, a remediation action is implemented to eliminate a known vulnerability, security issue, etc., after it has been identified.

In some embodiments, a remediation action includes any one of: generating an alert, updating a software to its latest version, providing extended support, implementing a firewall rule, applying an update from the vendor, isolating a software component from its infrastructure a combination thereof, and the like.

An example of initiating a remediation action, in response to a conditional rule being satisfied, in an embodiment is, a firewall rule is implemented in response to a software component reaching its EOL date. In an embodiment, the firewall rule isolates communication to a resource, from a resource, etc., deploying thereon the software component.

In an embodiment, an example of initiating a remediation action, in response to a conditional rule being satisfied, is in response to the software component "Rabbit AB, version 6.0" reaching within three months of its EOL Date of "May 6, 2024", "Rabbit AB version, 6.0" will be updated to its latest software version "Rabbit AB version, 6.1".

Figure 7:
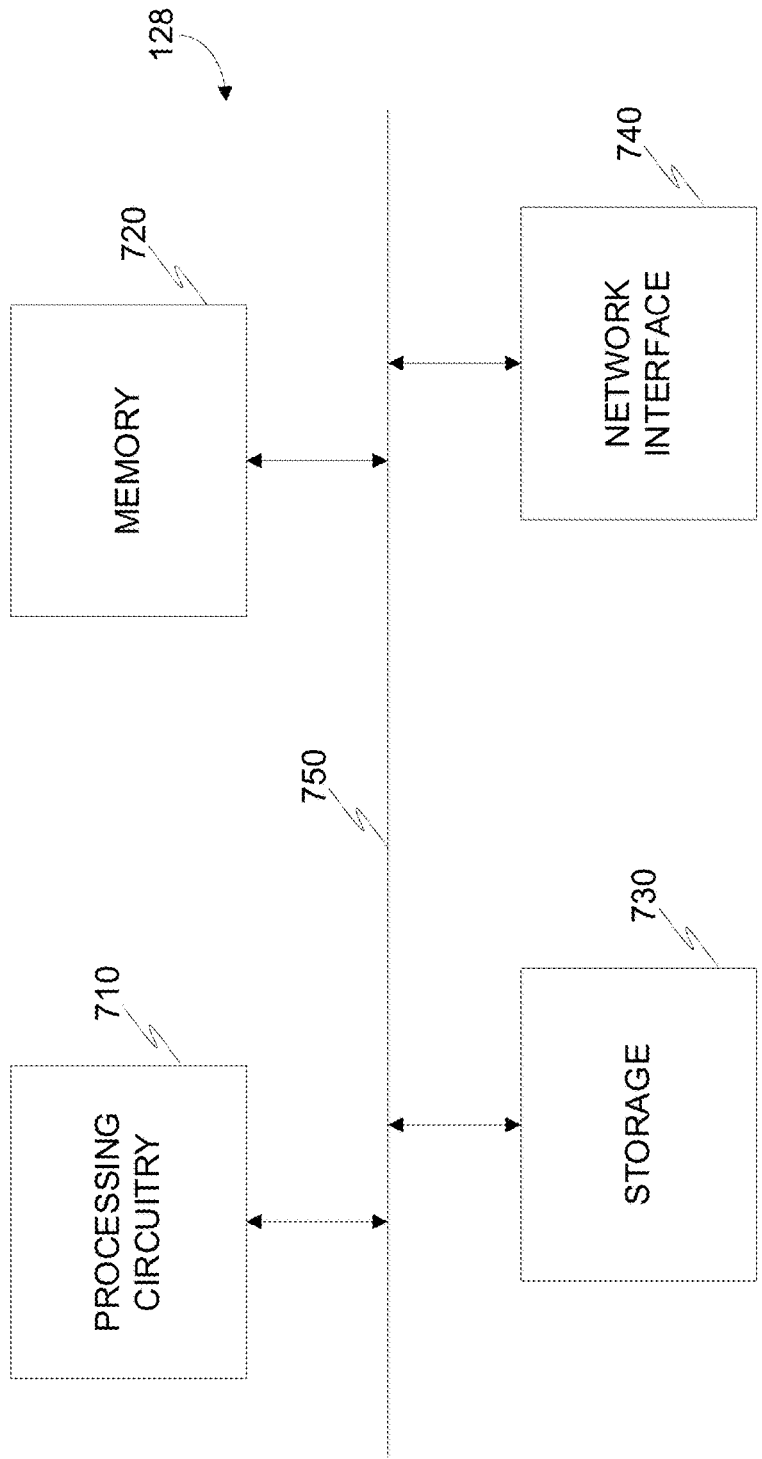
FIG. 7 is an example schematic diagram of an inspection controller, implemented in accordance with an embodiment.

FIG. 7 is an example schematic diagram of an inspection controller 128 according to an embodiment.

The inspection controller 128 includes a processing circuitry 710 coupled to a memory 720, a storage 730, and a network interface 740. In an embodiment, the components of the inspection controller 128 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof. In an embodiment, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein may be stored in the storage 730, in the memory 720, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 740 is configured to provide the inspection controller 128 with communication with, for example, an inspector 122, a virtual machine 126, a database (e.g. security database) 125, and the like.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for initiating a remediation action based on an End-Of-Life (EOL) date of a software component deployed in a cloud computing environment comprising:

inspecting resources of a cloud computing environment for a plurality of software components, each software component deployed on at least a resource;

detecting software components from the inspection of resources deployed in the cloud computing environment;

generating a software bill of materials (SBOM) for the cloud computing environment based at least on a detected software component, wherein the SBOM includes an identifier of the software component;

determining for the detected software component an end of life (EOL) date, wherein the EOL date is determined based on vendor data;

applying a policy including a conditional rule to the EOL date; and initiating a remediation action for the detected software in response to determining that the conditional rule is satisfied.

2. The method of claim 1, wherein inspecting resources further comprises:

assigning an inspector to inspect a resource, wherein the inspector is configured to detect a software component on the resource.

3. The method of claim 1, further comprising:

exposing the SBOM across a plurality of computing platforms utilizing an SBOM data exchange.

4. The method of claim 1, further comprising:

configuring an updater to periodically update SBOM metadata with vendor data.

5. The method of claim 4, further comprising:

configuring the updater to input an EOL date into the SBOM metadata for a software component of the SBOM.

6. The method of claim 5, wherein applying a policy including a conditional rule to the EOL date further comprises:

initiating a mitigation action for a software component in response to determining that the software component has reached within a predetermined time of its EOL date.

7. The method of claim 1, further comprising:

initiating a remediation action based on a known vulnerability, security issue, and a combination thereof.

8. The method of claim 7, further comprising:

initiating the remediation action, wherein the remediation action includes any one of: generating an alert, updating a software component to its latest version, applying an update from a vendor, isolating the software component from its infrastructure, and any combination thereof.

9. The method of claim 1, wherein the inspecting resources is performed by an inspector located in an inspection environment.

10. The method of claim 9, further comprising:

generating an inspectable disk for a resource of the cloud computing environment, and inspecting the inspectable disk for a cybersecurity object, wherein the cybersecurity object indicates a software component of the plurality of software components.

11. The method of claim 10, further comprising:

inspecting the inspectable disk for metadata of the software component.

12. A non-transitory computer-readable medium storing a set of instructions for initiating a remediation action based on an End-Of-Life (EOL) date of a software component deployed in a cloud computing environment, the set of instructions comprising:

one or more instructions that, when executed by one or more processors of a device, cause the device to:

inspect resources of a cloud computing environment for a plurality of software components, each software component deployed on at least a resource;

detect software components from the inspection of resources deployed in the cloud computing environment;

generate a software bill of materials (SBOM) for the cloud computing environment based at least on a detected software component, wherein the SBOM includes an identifier of the software component;

determine for the detected software component an end of life (EOL) date, wherein the EOL date is determined based on vendor data;

apply a policy including a conditional rule to the EOL date; and initiate a remediation action for the detected software in response to determining that the conditional rule is satisfied.

13. A system for initiating a remediation action based on an End-Of-Life (EOL) date of a software component deployed in a cloud computing environment comprising:

one or more processors configured to:

inspect resources of a cloud computing environment for a plurality of software components, each software component deployed on at least a resource;

detect software components from the inspection of resources deployed in the cloud computing environment;

generate a software bill of materials (SBOM) for the cloud computing environment based at least on a detected software component, wherein the SBOM includes an identifier of the software component;

determine for the detected software component an end of life (EOL) date, wherein the EOL date is determined based on vendor data;

apply a policy including a conditional rule to the EOL date; and initiate a remediation action for the detected software in response to determining that the conditional rule is satisfied.

14. The system of claim 13, wherein the one or more processors, when inspecting resources, are configured to:

assign an inspector to inspect a resource, wherein the inspector is configured to detect a software component on the resource.

15. The system of claim 13, wherein the one or more processors are further configured to:

expose the SBOM across a plurality of computing platforms utilizing an SBOM data exchange.

16. The system of claim 13, wherein the one or more processors are further configured to:

configure an updater to periodically update SBOM metadata with vendor data.

17. The system of claim 16, wherein the one or more processors are further configured to:

configure the updater to input an EOL date into the SBOM metadata for a software component of the SBOM.

18. The system of claim 17, wherein the one or more processors, when applying a policy a conditional rule to the EOL date are configured to:

initiate a mitigation action for a software component in response to determining that the software component has reached within a predetermined time of its EOL date.

19. The system of claim 13, wherein the one or more processors are further configured to:
- initiate a remediation action based on a known vulnerability, security issue, and a combination thereof.

20. The system of claim 19, wherein the one or more processors are further configured to:
- initiate the remediation action, wherein the remediation action includes any one of:
- generate an alert, update a software component to its latest version, apply an update from a vendor, isolate the software component from its infrastructure, and any combination thereof.

* * * * *